Figure 2B:
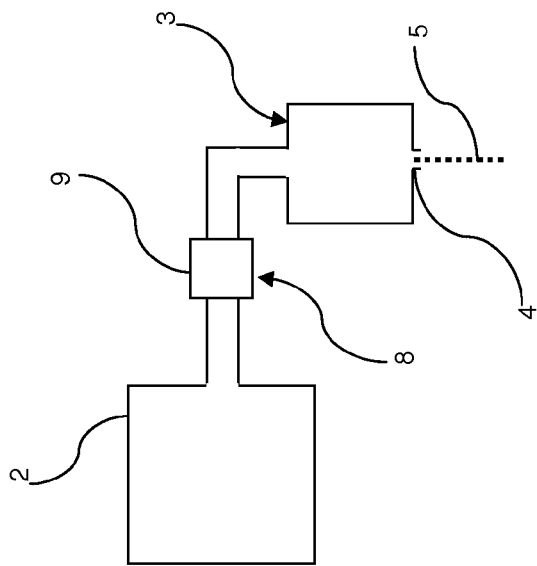
Figure 2A:
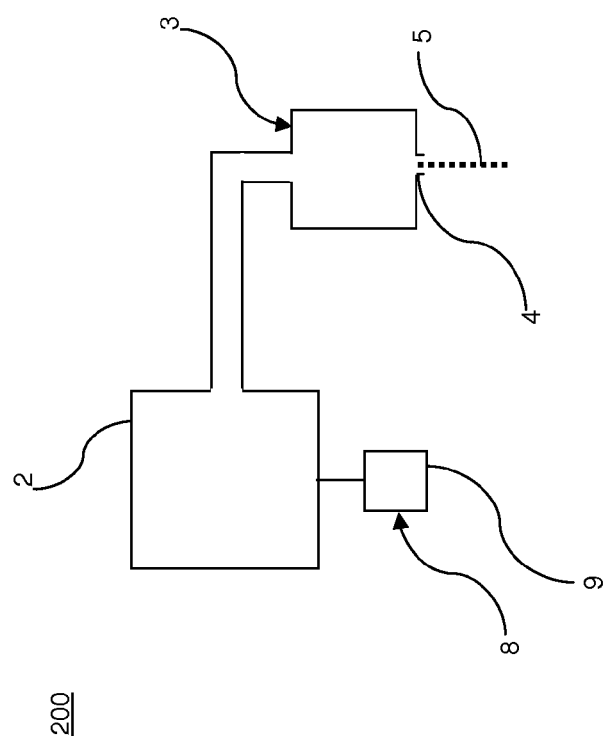

US009044725B2

(12) United States Patent
Houben et al.

(10) Patent No.: US 9,044,725 B2
(45) Date of Patent: Jun. 2, 2015

(54) EFFECTIVE DROPLET DRYING

(75) Inventors: René Jos Houben, Nederweert (NL); Leonardus Antonius Maria Brouwers, Beesel (NL); Gerrit Oosterhuis, Best (NL); Frits Verhoeven, Eindhoven (NL); Gerben Pieterse, Eindhoven (NL)

(73) Assignee: NEDERLANDSE ORGANISATIE VOOR TOEGEPAST-NATUURWETENSCHAPPELIJK ONDERZOEK TNO, Delft (NL)

( * ) Notice: Subject to any disclaimer, the term of this patent is extended or adjusted under 35 U.S.C. 154(b) by 943 days.

(21) Appl. No.: 13/146,160

(22) PCT Filed: Jan. 8, 2010

(86) PCT No.: PCT/NL2010/050006

§ 371 (c)(1), (2), (4) Date: Sep. 26, 2011

(87) PCT Pub. No.: WO2010/085143
PCT Pub. Date: Jul. 29, 2010

(65) Prior Publication Data

US 2012/0104111 A1 May 3, 2012

(30) Foreign Application Priority Data

Jan. 26, 2009 (EP) .................................... 09151348

(51) Int. Cl.
*B01J 2/02* (2006.01)
(52) U.S. Cl.
CPC ........................................ *B01J 2/02* (2013.01)

(58) Field of Classification Search
CPC .......................................................... B01J 2/02
USPC ......... 239/128, 131, 135, 290, 291, 292, 299, 239/461, 499; 159/48.1, 3, 4.01, 4.06, 4.07, 159/4.08; 424/489
See application file for complete search history.

(56) References Cited

U.S. PATENT DOCUMENTS

| | | | | |
|---|---|---|---|---|
| 1,350,072 A * | 8/1920 | Dean | ........................... | 159/48.1 |
| 1,476,761 A * | 12/1923 | Maclachlan | ................. | 426/473 |

(Continued)

FOREIGN PATENT DOCUMENTS

| | | |
|---|---|---|
| EP | 0 250 164 | 12/1987 |
| EP | 1367441 | 12/2003 |

(Continued)

OTHER PUBLICATIONS

International Search Report, PCT/NL2010/050006.

(Continued)

*Primary Examiner* — Justin Jonaitis
(74) *Attorney, Agent, or Firm* — Brinks Gilson & Lione

(57) ABSTRACT

In one aspect, the invention provides a system and method for spray drying a fluid. The system comprises a fluid reservoir (2), a spraying device (3) that comprises at least one outflow opening (4) for projecting droplets of fluid (5) from the reservoir (2) out of the at least one outflow opening (4) and at least one energy source (6) for at least partially drying the droplets. The spraying device (3) is arranged to project the droplets into a determinable droplet trajectory and the at least one energy source (6) is arranged for providing energy focused substantially on the droplet trajectory. It is an object of the invention to provide a system and method for reducing the amount of energy required for spray drying.

14 Claims, 14 Drawing Sheets

(56) References Cited

U.S. PATENT DOCUMENTS

| | | | | |
|---|---|---|---|---|
| 1,603,559 | A | * | 10/1926 | Schwantes .................. 264/8 |
| 1,779,516 | A | * | 10/1930 | Stevenson et al. ........... 159/48.1 |
| 1,866,769 | A | * | 7/1932 | Harris ........................ 159/4.08 |
| 4,795,330 | A | | 1/1989 | Noakes et al. |
| 6,479,077 | B1 | * | 11/2002 | Borra ........................... 424/489 |
| 2002/0113151 | A1 | | 8/2002 | Forber Jones et al. |
| 2008/0041532 | A1 | | 2/2008 | Chou et al. |

FOREIGN PATENT DOCUMENTS

| | | |
|---|---|---|
| KR | 20040005411 | 1/2004 |
| WO | WO 2008/069639 | 6/2008 |

OTHER PUBLICATIONS

International Preliminary Report on Patentability, PCT/NL2010/050006.

* cited by examiner

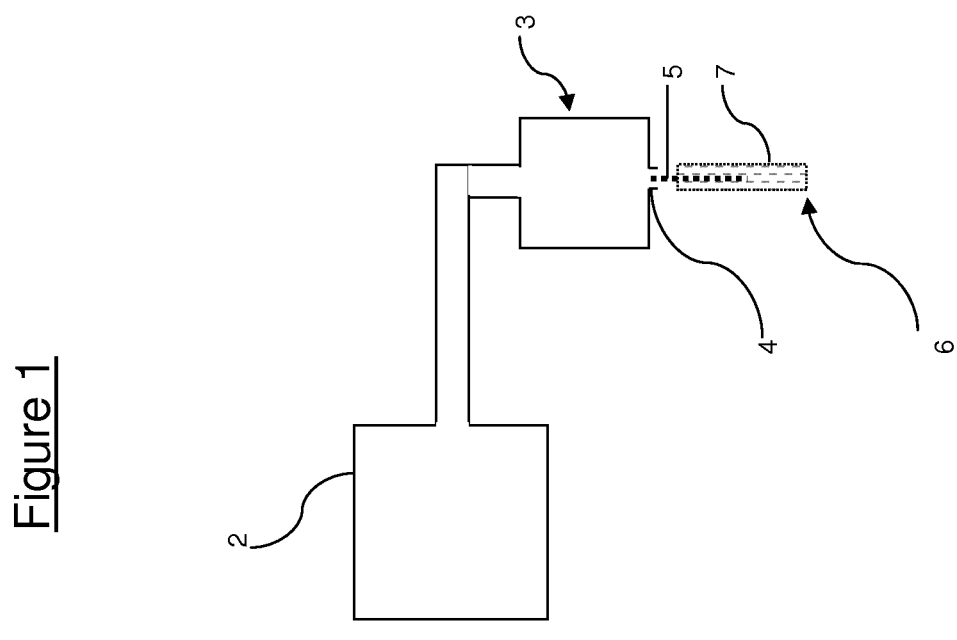

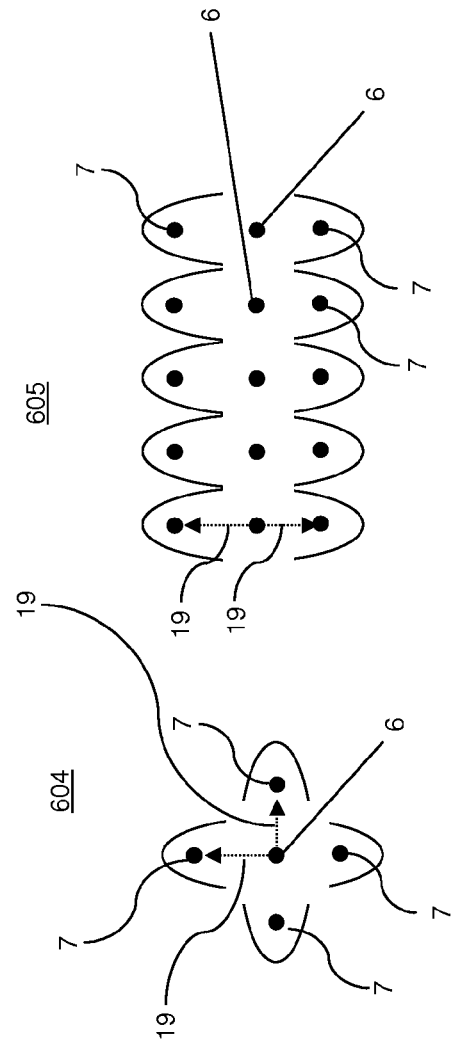
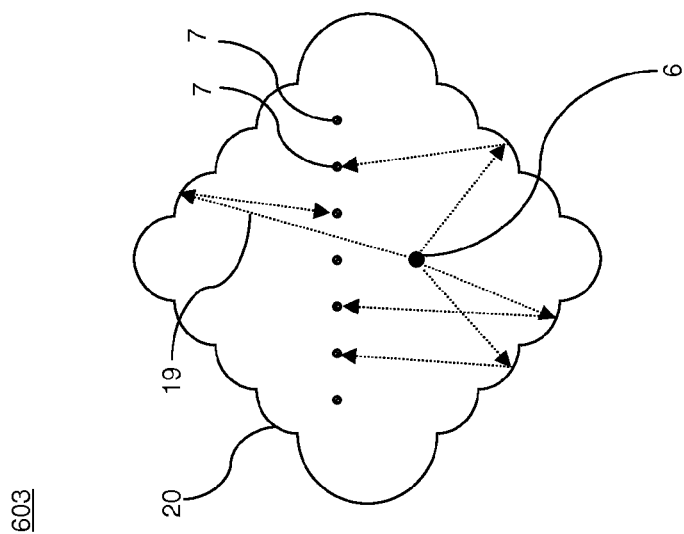
Figure 9C
Figure 9B
Figure 9A

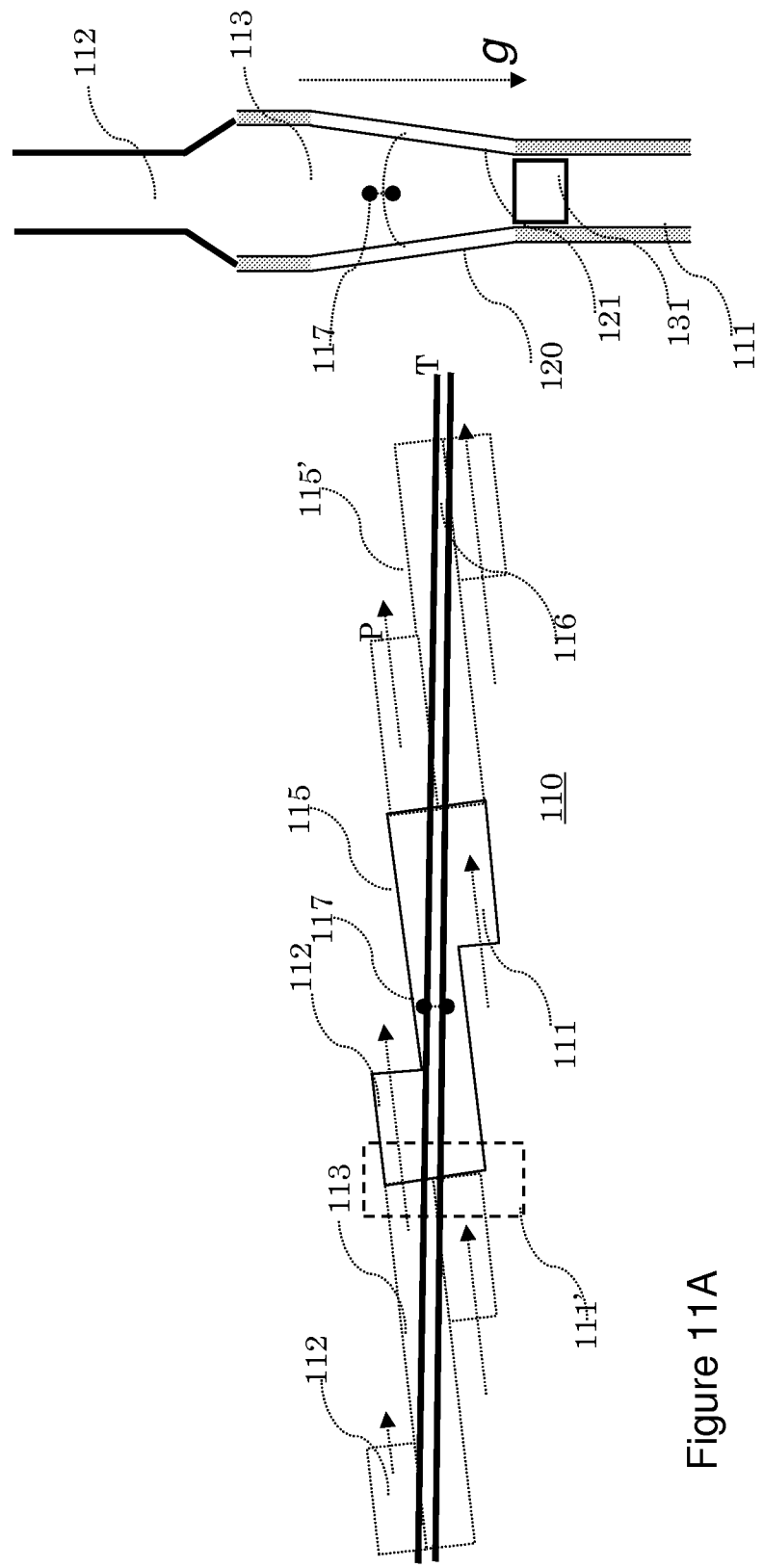

EFFECTIVE DROPLET DRYING

This application is a National Stage application of International Application No. PCT/NL2010/050006, filed Jan. 8, 2010, the entire contents of which is hereby incorporated herein by reference. This application also claims priority under 35 U.S.C. §119 to European Patent Application No. 09151348.1, filed Jan. 26, 2009, the entire contents of which is hereby incorporated herein by reference.

The invention relates to the field of drying fluids.

Drying a fluid means that droplets of the fluid are dried to become particles. In the remainder, the terms particles and droplets generally identify the same entity, depending on a drying stage. Drying of fluids is e.g. applied in the food industry for drying a nutrient or an ingredient therefore, like dairy, proteins, carbon hydrates, fats, or combinations thereof. Spray drying may further be applied for drying fluids such as, but not limited to, detergents, pigments, catalysts, pharmaceuticals, cosmetics, polymeric resins, ceramic powders, powder coating materials, adhesives, gypsum, cement, metal powders, etc.

In a conventional type of spray drying, the fluid is fed to a nozzle, which produces a mist of droplets of the fluid in a vessel. The droplets are subsequently dried, e.g. in a stream of air in a drying tower. A disadvantage of this method is that it takes a relatively large amount of energy for drying the droplets to become particles.

It is an object of the present invention to provide a system and method for reducing the amount of energy required for spray drying.

In one aspect, the invention provides a system for spray drying a fluid, the system comprising a fluid reservoir and a spraying device. The spraying device comprises at least one outflow opening for projecting droplets of fluid from the reservoir out of the at least one outflow opening and at least one energy source for at least partially drying the droplets. The spraying device is arranged to project the droplets into a determinable droplet trajectory and the at least one energy source is arranged for providing energy focused substantially on the droplet trajectory. By focusing, embodiments are meant to be encompassed wherein the energy is confined in a limited space around the droplet trajectory for example, by a heated gas flow guide. By a 'determinable trajectory' it is meant that a trajectory of individual droplets is largely determined by predefined course, for example a jet trajectory of jetted droplets, or a flow trajectory of a carrier flow.

In another aspect, the invention provides a method for spray drying a fluid. The method comprises the steps of projecting droplets of fluid from a reservoir out of at least one outflow opening and at least partially drying the droplets with energy provided by at least one energy source. The droplets are projected into a determinable droplet trajectory and the energy is focused substantially on the droplet trajectory.

FIGURES

FIG. 1 shows a schematic representation of the system for spray drying a fluid according to the invention.

FIG. 2 shows a schematic representation of a second embodiment of a system for spray drying a fluid according to the invention.

FIG. 3 shows a schematic representation of a third embodiment of a system for spray drying a fluid according to the invention.

FIG. 4 shows a schematic representation of a fourth embodiment of a system for spray drying a fluid according to the invention.

FIG. 5 shows an embodiment comprising a plurality of connected segments;

FIG. 6. shows an additional embodiment comprising tubular gas guides;

FIG. 7. shows an embodiment comprising a focused energy source according to the invention.

FIG. 8 shows embodiments of the focused energy source according to the invention.

FIG. 9 shows embodiments of the focused energy source according to the invention.

FIG. 10 shows embodiments of the focused energy source according to the invention.

FIG. 11 shows an alternative embodiment including a segmented gas flow system.

FIG. 12 shows a detail of the segment interface in FIG. 11.

FIG. 13 shows a calculated design for a box formed gas flow guide.

FIG. 14 shows calculated flow profiles for the structure of FIG. 13.

DESCRIPTION

FIG. 1 shows an embodiment of the system for spray drying a fluid according to the invention. The system 1 comprises a reservoir 2 and a spraying device 3. The spraying device is in fluid communication with the reservoir 2 for supplying the fluid to be spray dried to the spraying device. The spraying device comprises at least one outflow opening 4 and is arranged for projecting droplets of fluid 5 from the reservoir 2 out of the at least one outflow opening 4. An outflow opening may comprise a nozzle. The terms outflow opening and nozzle will be used as synonyms in the following. A mechanism for projecting droplets known from the prior art is the so-called Rayleigh break-up mechanism. A projecting apparatus based on this mechanism, typically comprises a vibrating nozzle or vibrating nozzle plate. The system further comprises at least one energy source 6 for at least partially drying the droplets. The system is characterized in that the spraying device is arranged to project the droplets into a determinable droplet trajectory and the at least one energy source 6 is arranged for providing energy 7 focused substantially on the droplet trajectory.

In the embodiment shown in FIG. 1, the spraying device 3 comprises one outflow opening 4. It will be appreciated that it is also possible that the spraying device 3 comprises a plurality of outflow openings 4 for projecting the fluid out of the plurality of outflow openings 4 for obtaining droplets of the fluid. Thereto, the outflow openings 4 may e.g. be arranged as bores in a surface of the spraying device 3.

To provide a determinable droplet trajectory, the embodiment of the spraying device 200 illustrated in FIG. 2A comprises feed pressure generating means 8 for providing the fluid to the outflow opening 4 at a predetermined feed pressure for obtaining a fluid jet. Other mechanisms for providing a determinable droplet trajectory may also be used. Here, the feed pressure generating means 8 are arranged for keeping the feed pressure substantially constant. Hence, a fluid jet is generated, while the feed pressure generating means 8 substantially do not disturb the jet. Adding feed pressure generating means 8 is only one way to provide a determinable droplet trajectory. Other ways are possible. In this embodiment, the feed pressure generating means comprise a pump 9 for supplying the fluid at the desired pressure.

In another embodiment of the spraying device according to the present invention 201, shown in FIG. 2B, the pump 9 is positioned between the reservoir 2 and the spraying device 3 such that the fluid from the reservoir 2 is supplied to the spraying device 3 under pressure. In this embodiment, the pump 9 is arranged for keeping the feed pressure substantially constant. Thereto, the pump 9 may comprise a pressure regulator, such as an overpressure valve and/or a pressure regulating valve and/or a damper. Alternatively, or additionally, the feed pressure generating means 8 may be arranged for applying pressure to the fluid hydraulically or pneumatically for keeping the feed pressure substantially constant, i.e. the feed pressure generating means 8 may use pressurized liquid or gas, respectively, to exert a substantially constant pressure on the fluid. In this embodiment the pump may be arranged to vary the flow rate so as to keep the pressure constant.

In another embodiment, the pump may be arranged so as to keep the flow rate constant, which results in a certain pressure. An example of such a pump is a constant flow pump.

Figure 3:
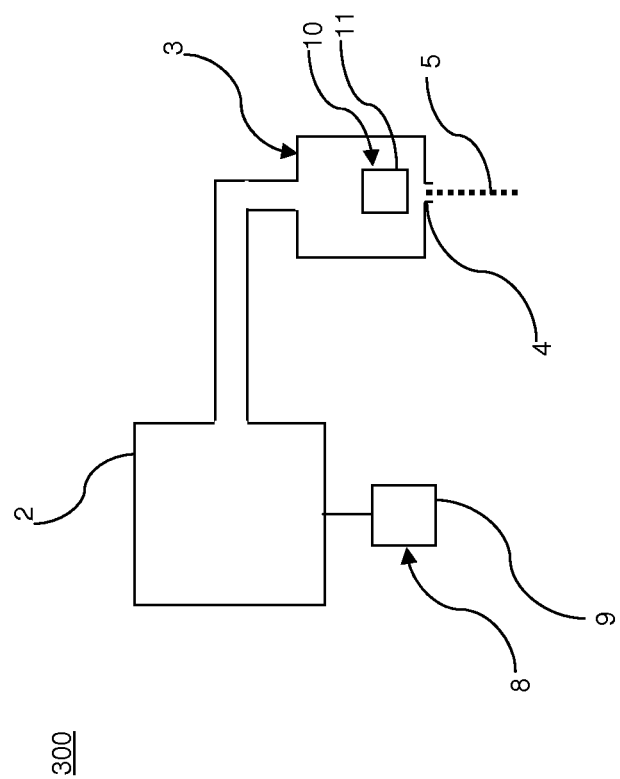

Another embodiment of the system for spray drying a fluid 300 is shown in FIG. 3. This embodiment is essentially the same as the previous embodiment. However, the spraying device 3 comprising a vibrating nozzle 10 arranged for providing monodisperse droplets by Rayleigh break-up. Therefore this embodiment further comprises pressure varying means 10 for varying the pressure of the fluid upstream of the outflow opening 4. When the jet is projected from the outflow opening 4, variations in the pressure of the fluid of the jet cause the jet to contract at points of minimum pressure. Subsequently, the fluid jet will break up at the contractions, thus forming droplets of fluid 5. The amplitude of the variations in the pressure of the fluid may be approximately 10% of the feed pressure. The amplitude of the variations in the pressure may be 1 mbar to 100 bar, preferably smaller than or equal to 25 bar.

In the embodiment illustrated in FIG. 3, the pressure varying means 10 comprise a control element 11, which is movable in a direction from/to the outflow opening 4. Vibrating the control element 11 relative to the outflow opening 4 causes the pressure of the fluid to vary between the control element 11 and the outflow opening 4. When the fluid is projected from the outflow opening 4 in the fluid jet, the variations in pressure in the fluid extend into the fluid jet. The pressure varying means 10 may e.g. comprise a piezo-electric element, an electrostrictive element, an acoustic element, an electromagnetic actuator, a voice-coil, and/or mechanical means for moving the control element 11 in the direction to/from the outflow opening 4.

If the spraying device 3 comprises a plurality of outflow openings 4, a single control element 11 may be used for varying the pressure of substantially all fluid jets generated by the plurality of outflow openings 4.

In another embodiment similar to the embodiment shown in FIG. 3, the control element is arranged for varying the pressure of the fluid upstream of the outflow opening 4 at a predetermined frequency. Preferably, the predetermined frequency is substantially constant. Hence, the fluid jet will contract, and subsequently break up, at substantially equidistant positions along the fluid jet. Thus, substantially equally sized droplets will be formed. Droplets may be provided with a relatively narrow droplet size distribution, e.g. a droplet size distribution with a monodispersity index of less than 1, preferably smaller than 0.7, more preferably smaller than 0.1. The monodispersity index of the droplet size distribution is defined as (d90-d10/d50), wherein d10, d50 and d90 represent the 10%, 50% and 90% droplet size percentiles, respectively.

When the fluid is substantially homogeneous, substantially equal sized droplets will have substantially equal mass.

This is only one possible way of providing monodisperse droplets, other ways may be possible.

In case of a plurality of outflow openings 4, the outflow openings 4 may have substantially identical dimensions, to allow droplets of substantially identical dimensions to be ejected from each separate outflow opening 4, hence allowing the droplets to be produced with the relatively narrow size distribution.

An advantage of providing monodisperse droplets may be that the amount of drying energy can be related to the size of the droplets and the desired degree of drying. Because the droplets have substantially the same size, the drying result of the droplets will be substantially the same. This may reduce the amount of energy required for drying the droplets because it is no longer necessary to choose the amount of energy such that even the largest droplets will reach the preferred degree of drying. Also, because the droplets substantially have the same size, formation of particles may be prevented that are smaller than the desired droplet size. Smaller droplets could become too dry and even burn. Although the burning of droplets could be useful in some situations, it is typically unwanted. In contrast with conventional atomizing systems, so called fines (ultra fine particles) are not formed, which is beneficial for efficient reuse of energy since fines can cause problems and pollution in heat exchanger systems.

Preferably, the amount of energy will be such that the droplets will completely and efficiently dry without forming a hard crust around the surface of the droplet. Such a crust may prevent water in the inside of the droplet to diffuse to the surface and may therefore disturb the drying process. There may however also be situations in which it is desired to only partially dry the droplets. In yet other circumstances, it may be preferred to provide an amount of energy such that pyrolysis of droplets comprising an organometallic compound occurs. This may e.g. be useful in the field of droplet printing electrical components like insulators and semiconductors on substrates.

The present invention wherein monodisperse droplets are dried over a predeterminable trajectory further enables to optimize the drying process by selectively providing energy along the trajectory. This means that the amount of energy supplied to the droplet may vary depending on the position of the droplet in the trajectory and therefore depending on the drying degree of the droplet. Examples of energy sources arranged for selectively providing energy along the droplet trajectory are shown in FIG. 8 and are described later.

Coagulation of droplets may be harmful for a narrow droplet distribution. Several precautions may be taken to prevent coagulation.

First, the predetermined pressure varying frequency of the pressure varying means 10 may be chosen such that a distance between two droplets consecutively ejected at the outflow opening 4 is greater than or equal to two times the droplet diameter, preferably greater than or equal to three times the droplet diameter.

Second, in case of a plurality of outflow openings 4, the nozzles 4 may be arranged for generating a plurality of mutually divergent jets of the fluid. When the jets are mutually divergent, the risk of coagulation of droplets ejected by mutually different nozzles 4 is reduced, since the distance between the droplets ejected by the mutually different nozzles 4 increases during flight.

Third, the distance between two adjacent nozzles 4 of the plurality of nozzles 4 may be larger than 1.5 times a transverse dimension, such as a diameter, of at least one of two adjacent nozzles 4, more preferably larger than 2 times, most preferably larger than or equal to 2.5 times the transverse dimension. This also reduces the risk of coagulation of droplets.

Also, referring to the FIG. 4 embodiment, to further enhance the determinability of the droplet trajectory, the aerodynamic positioning may comprise accelerating the droplets 5 to prevent coagulation. This may reduce the probability of droplet coagulation.

The system for spray drying a fluid according to the present invention may be used with a variety of droplet generating systems. The droplets may e.g. be generated continuously or non-continuously, e.g. on a drop-on-demand basis. Further, droplets of low viscosity fluids may be generated, e.g. droplets of saline solutions with a viscosity of 2 mPa·s and also high viscosity droplets may be generated, e.g. with a viscosity of 250 mPa·s.

Spray drying high viscosity fluids is desired for example in the food processing industry, e.g. for drying milk. In conventional milk drying, the milk may be atomized and dried in a drying tower. Milk comprises a substantial amount of water and removing such an amount of water in a drying tower may not be very energy efficient. Using high viscosity printing systems enables to first extract water from the milk in an energy efficient way and subsequently dry the extracted high viscosity of milk droplets. An exemplary viscosity of extracted high viscosity milk droplets is 250 mPa·s. Drying extracted milk droplets may be much more energy efficient than the conventional milk drying process.

Projecting the droplets into a determinable droplet trajectory and arrange an energy source for providing energy focused substantially on the droplet trajectory, as in the present invention, may even further increases the energy efficiency of the drying process.

To print high viscosity fluids, in another embodiment the spraying device 3 is further arranged to cause a pressure drop in the fluid across the outflow opening 4 which is larger than 15 bar, so as to enable projecting droplets of fluid with a viscosity of at least 100 mPa·s. Projecting droplets of high viscosity fluids enables to spray dray fluids with a larger concentration of dry matter. This means that less fluid has to be removed while drying the droplets. This may increase the energy efficiency.

For printing high viscosity fluids, the pressure drop in the fluid across the outflow opening 4 is preferably between 50 bar and 400 bar and more preferably between 100 and 200 bar.

The viscosity of the fluid is higher than 10 mPa·s, preferably higher than 25 mPa·s, more preferably higher than 50 mPa·s even more preferably higher than 100 mPa·s, and most preferably higher than 200 mPa·s, determined at the temperature which in use prevails in the outflow opening 4. The temperature of the material to be printed is preferably between −50 and 300° C. and more preferably between 40 and 100° C. The shear rate as in use present in the outflow opening 4 is preferably between $1 \cdot 10^4$ and $1 \cdot 10^6$ s$^{-4}$ and more preferably $5 \cdot 10^5$ s$^{-1}$, using a capillary viscosity meter.

The smallest transverse dimension, such as a diameter, of the outflow opening 4 may be smaller than or equal to 150 micrometer, preferably smaller than or equal to 100 micrometer, more preferably smaller than or equal to 80 micrometer and most preferably smaller than or equal to 60 micrometer.

The combination of the pressure drop, high viscosity and dimension of the nozzle 4 provide that droplets of the high-viscosity fluid can be produced having a desired size of preferably smaller than or equal to 250 micrometer in average and more preferably smaller than or equal to 100 micrometer in average.

Spray drying a high viscosity fluid desires the feed pressure in the interval of 15-3000 bar and preferably in the interval of 15-600 bar.

Spray drying a high viscosity fluid desires the control element (11) being positioned at a predetermined distance between 2 and 1500 micrometer and preferably between 15 and 500 micrometer to the outflow opening (4). This provides the advantage that a pressure variation exerted to the high-viscosity fluid is prevented from being damped by the high-viscosity fluid to an extent that the jet projected from the outflow opening 4 does not experience a pressure variation with large enough amplitude to effectively break up into droplets.

In an inkjet printing system, the transverse dimension of the droplets, e.g. the diameter depends on the flow rate and the pressure varying frequency. E.g. an outflow opening with a flow rate of 2.4 ml/min and a pressure varying frequency of 40.000 Hz obtains an average droplet diameter (d50) of 124 micrometer. The same flow rate of 2.4 ml/min and a much lower frequency of 500 Hz results in a droplet diameter of 535 micrometer. It is noted that droplet diameter refers to the diameter of the droplet directly after leaving the outflow opening. The dimensions of the dried powder particle may be smaller.

In principle, the droplet diameter does not depend on the diameter of the outflow opening. However, the diameter of the outflow opening may influence the possible flow rates. It might e.g. not be possible to stably push as little as 0.2 ml/min through the same 80 micrometer nozzle.

For a flow rate of 2.4 ml/min, the diameter of the nozzle is preferably 80 micrometer, and a flow rate of 0.6 ml/min is preferable combined with a 30 micrometer nozzle. The latter flow rate of 0.6 ml/min combined with a pressure varying frequency of 40.000 Hz results in droplets with a diameter of 78 micrometer and combined with a frequency of 500 Hz in droplets with a diameter of 337 micrometer.

To further enhance the determinability of the droplet trajectory, the system for spray drying a fluid may comprise a gas flow guide arranged for manipulating a droplet guiding gas stream to aerodynamically position droplets into the predeterminable droplet trajectory. Furthermore, the gas flow guide may form an effective means in itself to provide energy focused substantially on the droplet trajectory. The gas stream may e.g. be a stream of air. If it is desired to prevent oxidation of the droplets of fluid, nitrogen, argon or any other suitable oxidation preventing gas may be used. In some situations, a slight oxidation of the droplets may be helpful. In these cases e.g. a mixture of oxygen and argon could be used.

Figure 4:
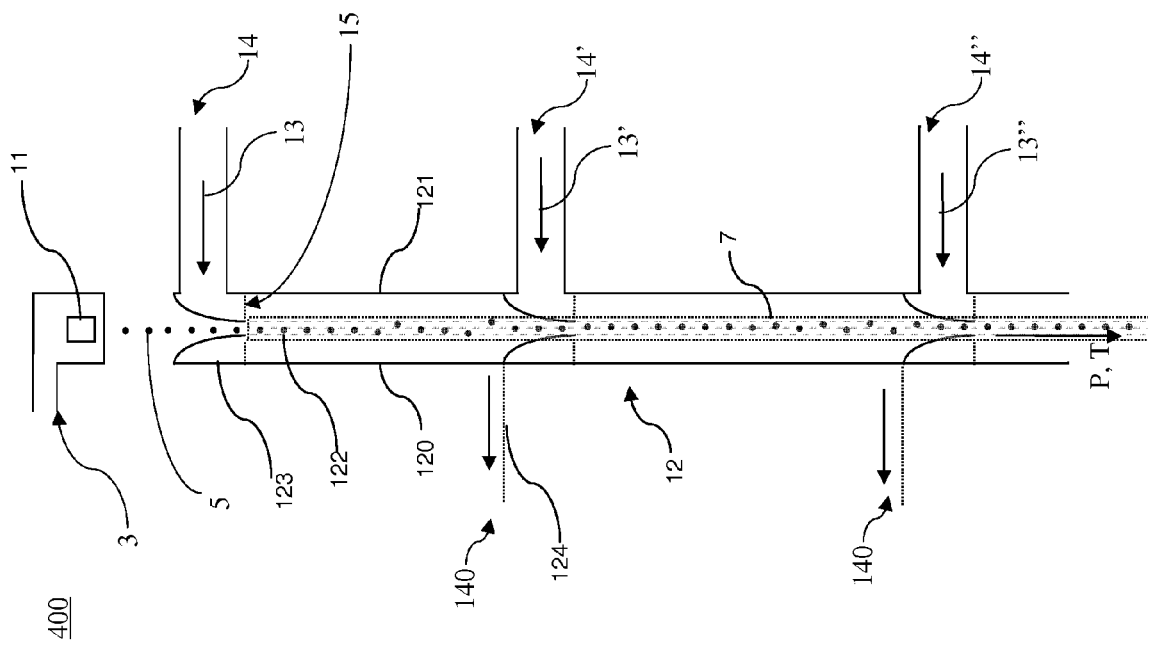

An example of such a gas guided drying system 400 is shown in FIG. 4. The drying system 400 comprises a spray head 3 comprising a control element 11. While many variations of the gas guide are possible, in this embodiment, the droplets of fluid 5 are projected in a tube 12 in which a gas stream 13 is provided through a gas supply opening 14. It is noted, that although this embodiment can be usefully employed with the vibrating nozzle arrangement 3 disclosed herebelow, the spray head may include other atomizing means, including embodiments wherein the droplet trajectory becomes determinable only after reception in the gas guide 12.

In more detail, the gas flow guide comprises an inlet piece 123 and an outlet piece 124 defining a generic flow direction P and a droplet trajectory T along oppositely arranged upstanding walls 120, 122, the walls defining an elongated space 122 in between the upstanding walls 120, 122 of limited width and having an axial direction aligned with the droplet trajectory T; in use arranged to provide a gradiented laminar gas flow in the gas guide 12 and having a gas flow velocity equal or larger than the particle velocity, thereby defining the particle trajectory T. Here, flow direction P and particle direction T are aligned in the same direction.

The gas stream 13 is preferably laminar and has a parabolic profile due to the tube form of the gas guide 12.

The gas stream has preferably the same velocity as the droplets of fluid 5 or a larger velocity. The droplets follow the stream of gas, but little differences in the size and shape of the droplets may cause them to deviate from their trajectory. Using the gradiented velocity profile, in particular a parabolic profile, of the gas flow, the droplets 5 are stabilized by an aerodynamic lift effect that substantially forces the droplets into a preferred trajectory through the tube 12, for example, along the centre axis of the tube. It is noted that if the droplets 5 have a higher velocity than the gas flow, this effect may be reversed and the droplet 5 will then move away from the centre of the flow, which may be undesirable.

Aerodynamically correcting the droplets may also prevent droplets from being stuck in the spray drying system and thus polluting the system.

Optionally a diffuser 15 is provided for effecting a gradual influx of the gas. Another option is to provide a plurality of gas streams 13' and 13" through a plurality of gas supply openings 14' and 14" for further stabilizing the system. The gas streams may be conditioned, in particular, dried and/or heated. Outflow openings 140 are provided to divert the outflow gas steams 13, 13' 13".

Figure 5:
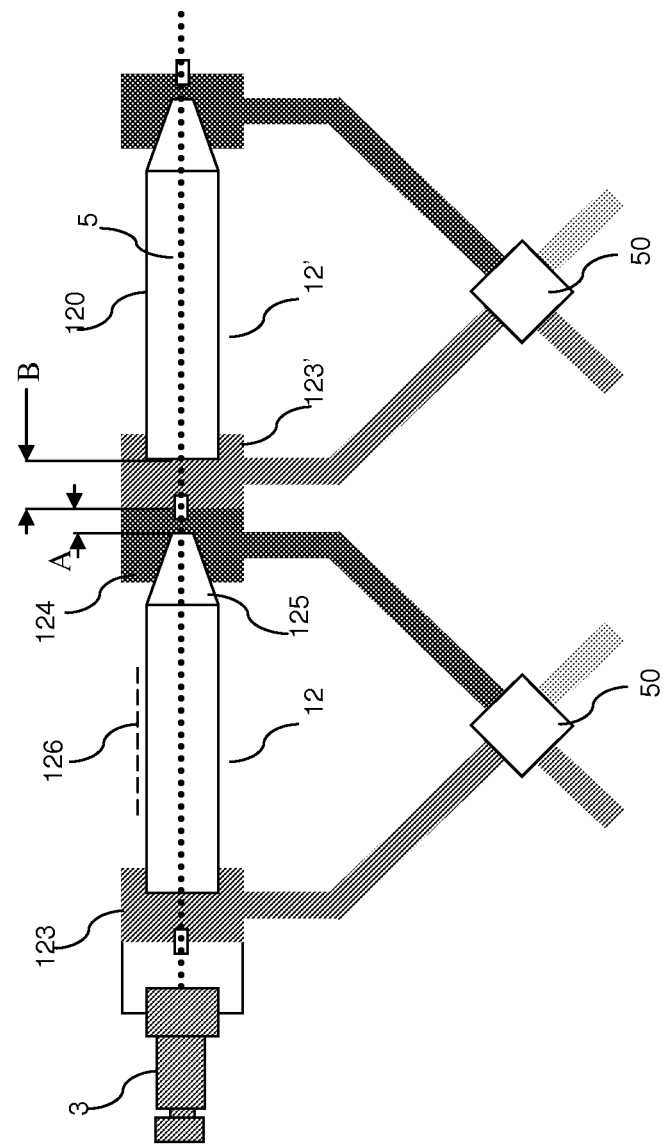

As further shown in FIG. 5, energy reuse may be provided by heat exchanger and conditioner systems 50. Aerodynamic positioning can be used to "shoot" droplets towards the next heating zone. Heat exchanger 50 removes "cold"-"wet" gas and replaces it with preheated "dry"-"warm" gas. Alternatively, conditioning may be provided with non-recirculated gas, in a way similar as shown in FIG. 11.

In particular FIG. 5 shows a plurality of connected segments 12, 12' each provided with a particle inlet 123 and a particle outlet 124, and an air flow regulating structure 125 arranged to accelerate the droplets towards each droplet outlet 124; and have the air flow diverted from the droplet trajectory 5.

Such a flow regulating structure may be provided as a constriction 125 accelerating the flow until a Stokes number>1 so that the particles continue their trajectory and no longer follow the air stream. Distance A should be short enough so that the droplets keep a Stokes number>1 so they keep following their own trajectory. Distance B should be taken long enough the to give the droplets 5 time to slow down to such an extent that the flow in the tube 12 is larger than the droplet speed, resulting in droplet stabilization. If the distance is too short, the droplets 5 may be destabilized by the airflow causing them to hit the wall of the tube 12. Accordingly, distance B functions as a deceleration structure provided between subsequent segments 12, 12' to decelerate the droplet prior to receiving the particle in a particle inlet 123' of a subsequent segment 12'.

It is noted that other deceleration methods may be considered, such as locally increasing a gas pressure or the like; or that a deceleration structure may be dispensed with, as illustrated in the embodiments of FIG. 11-14.

One aspect of the invention is an energy source 126 providing energy focused substantially in the droplet trajectory. According to the embodiment, a heater 126 may be arranged in the walls 120 of the gas guide. It is noted that the gas guide 12 may, through proper dimensioning, have any orientation respective to the gravity direction, but is preferably held substantially horizontal. In addition, the tubes 12 may be curved to provide compact designs, for example, in the form of a coil system. In addition, the tubes 12 may be clustered. It is noted that by (thermal) conditioning of the gas flow the heater 126 may be dispensed with while providing localized evaporation energy to the droplets resulting in droplet drying.

Figure 6:
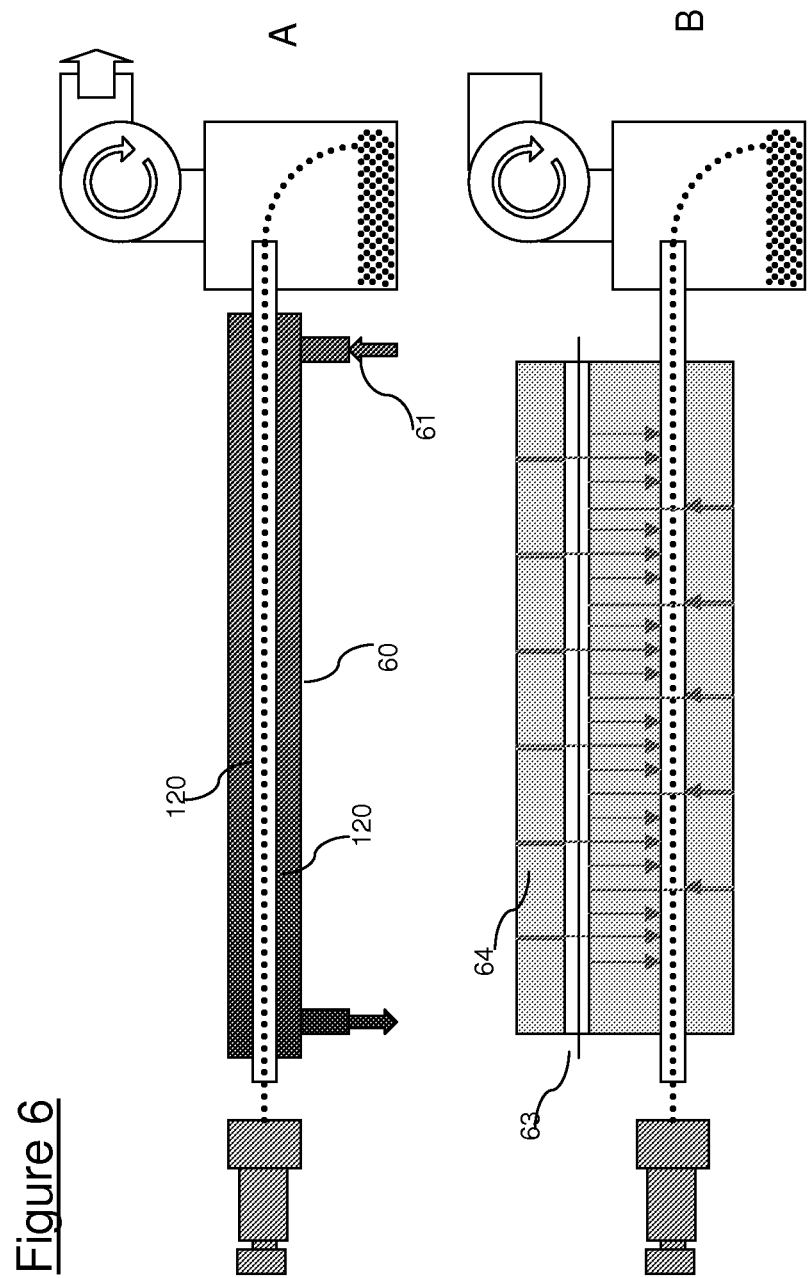

FIGS. 6A and 6B show additional examples of a tubular gas guide 60 with a constant airflow, and heating being applied externally along the gas guide walls 120 to focus energy along the droplet trajectory. Heating may be provided by a fluid counter flow 61 opposite to the gas flow pulling the droplets through the tube 60. While FIG. 6A shows heating by a heated counterflow 61, alternative heating is possible, for example, by a heating coil wound (not shown) around the tube. Alternatively, FIG. 6B shows heating the trajectory via an IR radiation 63 reflected by reflectors 64 towards the trajectory, in a way further exemplified in FIG. 7.

FIG. 7 illustrates an embodiment of an energy source 600 according to the present invention, wherein the reflective energy focusing element 20 comprises at least part of an elliptical mirror 17 and wherein the at least one energy source 6 is positioned in a first focal point 16 of the at least part of an elliptical mirror 17 so as to focus at least part of the radiated energy in a second focal point 18.

Figures 7A, 7B:
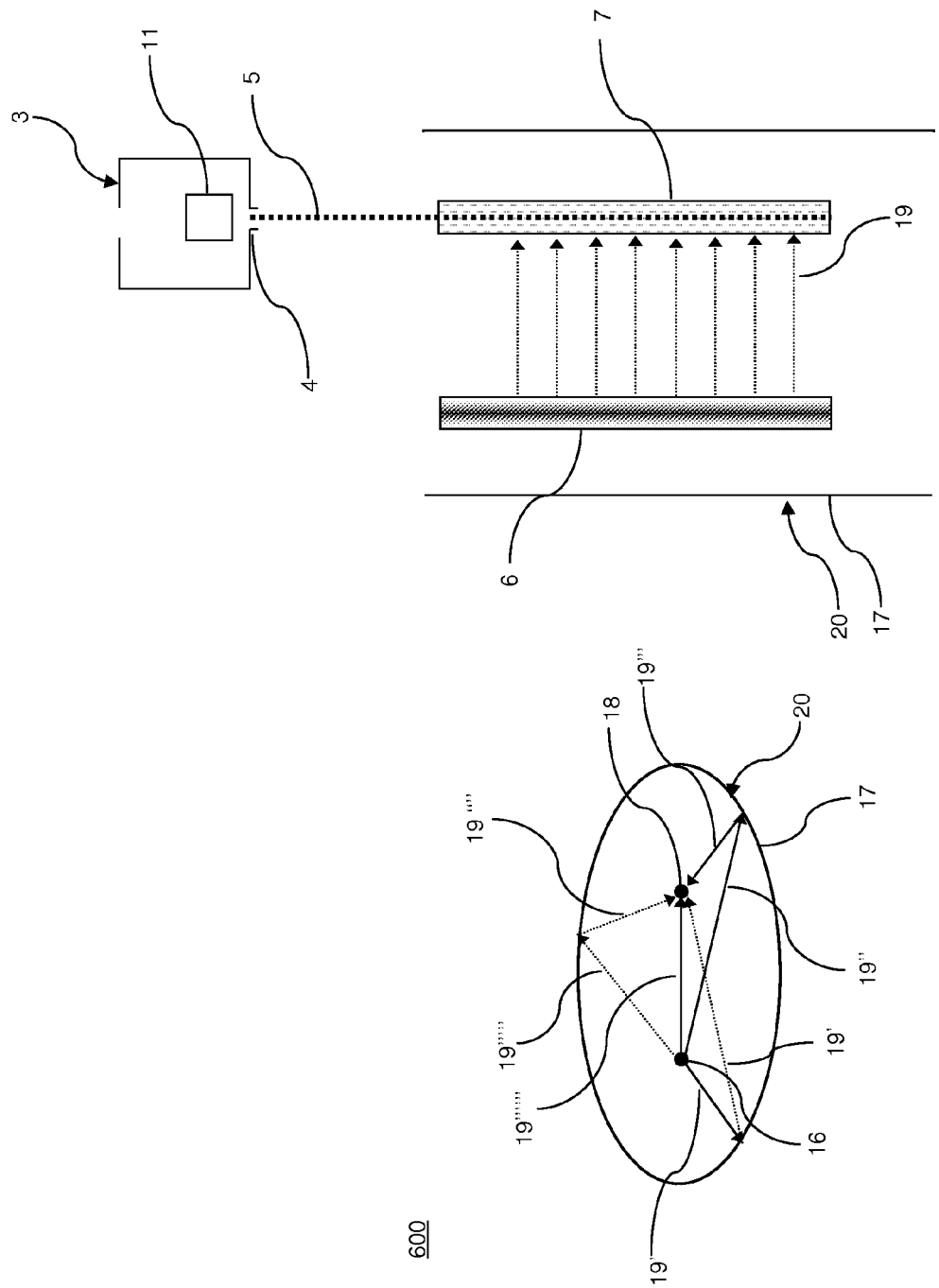

In this embodiment, the energy source 600 is positioned in a first focal point 16 of at least part of an elliptical mirror 17 so as to focus at least part of the radiated energy in a second focal point 18. Focusing the energy may increase the drying efficiency and/or drying speed as described above. In this embodiment, the energy source 600 in the first focal point 16 may e.g. comprise a heater with a glow spiral. However, other energy sources like infrared light sources are also possible. FIG. 7A shows a top view of this embodiment of the energy source 600, wherein radiation beams 19, 19', 19'', 19''', 19'''', 19''''' and 19'''''' are shown. (For clarity, in the following figures, not all the radiation beams 19 are shown.) Radiation beam 19 travels directly from the energy source 6 in the first focal point 16 to the second focal point 18. The other beams travel indirectly, i.e. being reflected by the mirror 17, from the first to the second focal point. FIG. 7B clearly shows a side view of this embodiment, wherein the radiation beams 19 travel from the energy source 6 in the first focal point 11 to focus energy 7 in the second focal point 18.

In conventional spray drying techniques, heated air is applied, e.g. convective or direct to the droplets. Air heating reduces air relative humidity, which is the driving force for drying. Besides, higher temperatures speed up diffusion of water inside the solids, so drying is faster. However, quality considerations limit the applicable rise to air temperature. Too hot air may lead e.g. to crust formation or 'case hardening'.

When applying radiation driven drying, e.g. dielectric drying, droplets are heated and dried by means of radiofrequency or microwaves being absorbed inside the material. Radiation driven drying may be more efficient and/or faster than air drying techniques. First, the wavelength of the radiation source, e.g. an infrared source may be matched to the absorption characteristics of the material. Other radiation sources are possible, e.g. light sources in another than the infrared spectrum. Second, it may be possible to apply more power to the droplets via radiation than via heat drying without burning the droplets, forming a crust or causing the occurrence of case hardening effects'. Preliminary experiments have shown that droplets may be spray dried eventually over a trajectory between 50 centimeters and one meter. This is very advantageous compared to the big drying towers in use for applying conventional spray drying methods.

Figure 8B:
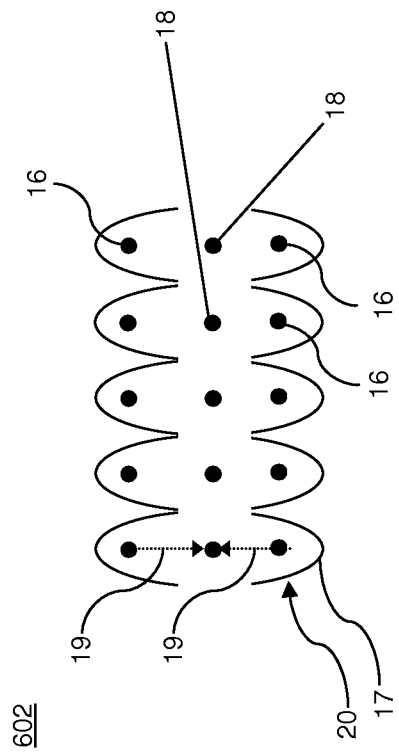
Figure 8A:
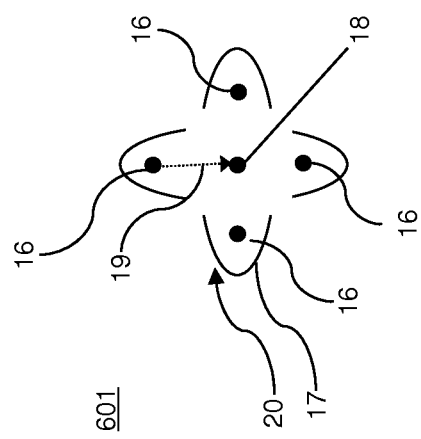

FIG. 8 shows several alternatives for configuring the focused energy source. FIG. 8A shows an energy source 601 comprising four parts of elliptic mirrors 17 positioned orthogonally towards each other, such that the four second focal points 18 of the mirrors 17 overlap. This way, the energy of four energy sources 6 is collected in one shared focusing point. In FIG. 8B, an energy source 602 is shown, comprising five adjacent mirror structures, wherein each mirror structure comprises two elliptic mirrors 17 being positioned opposite each other, with overlapping second focal points 18 wherein the energy of two energy sources 6 is focused. This configuration is adapted to a spray system comprising five outflow openings 4 being positioned on a line.

FIG. 9 shows embodiments of focused energy sources wherein the reflective energy focusing element 20 is arranged to focus the radiated energy of the at least one energy source 6 in a plurality of focal points.

This is advantageous because preliminary experimental results show that the energy needed to dry a typical droplet train may be between 0.1 and 10 Watt. The power of an infrared (IR) energy source 6 is typically at least 1000 Watt, which may be too high and burn the droplets instead of drying them with the risk to cause an explosion.

In FIG. 9A, an energy source 603 is shown comprising an energy source 6 being positioned within a reflective energy focusing element 21 that focuses the energy of the energy source 6 on seven beams of energy 7.

The energy source 604 shown in FIG. 9B is similar to the configuration of FIG. 8A, wherein the radiation of one energy source 6 is distributed over four beams of energy 7. The energy source 605 shown in FIG. 9C is similar to the configuration of FIG. 8B, wherein the radiation of five energy sources 6 is distributed over ten beams of energy 7.

An alternative way to distribute the energy of a single energy source over a plurality of droplet trains is to position a plurality of outflow openings above a single beam of energy. This may e.g. be done in the configuration shown in FIG. 7A.

Figure 10A:
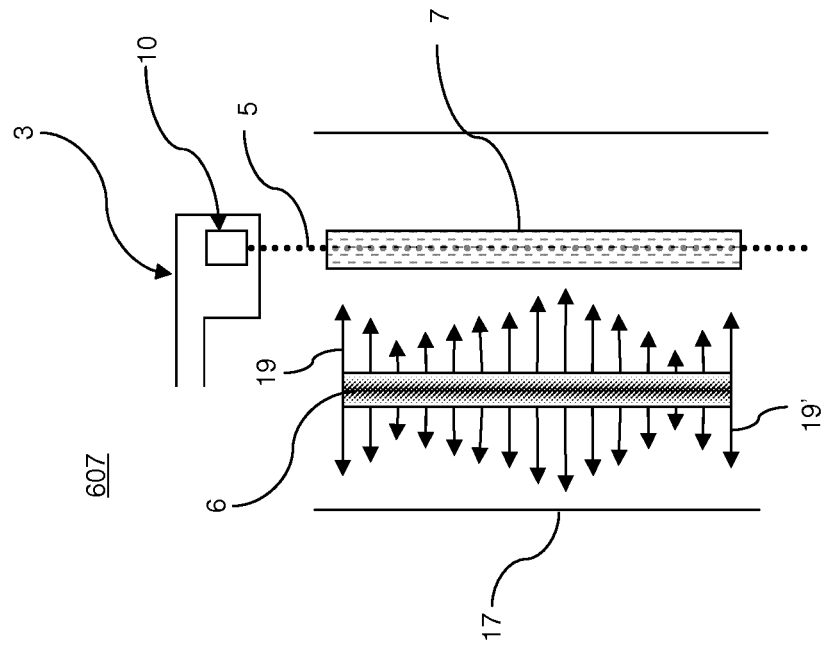
Figure 10B:
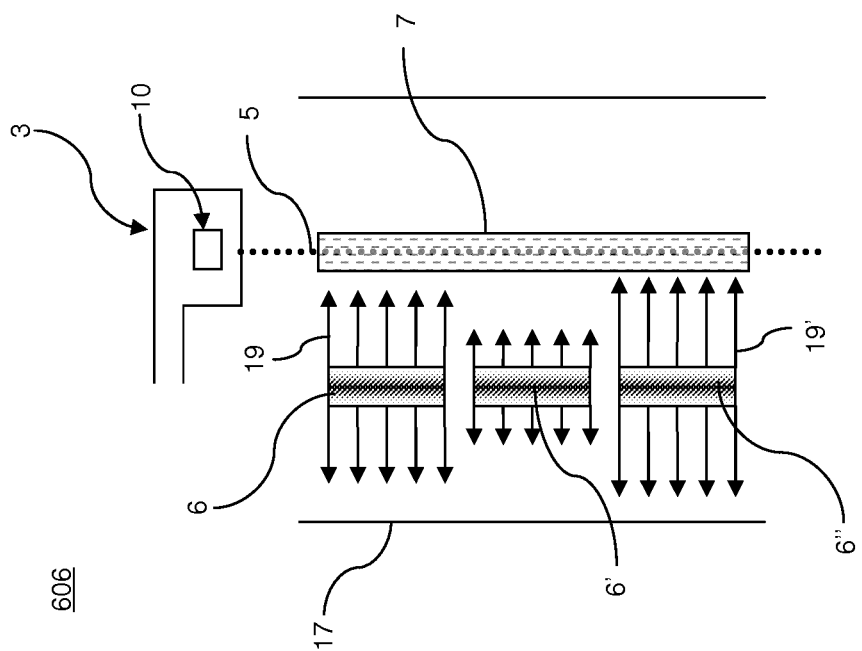

In the above it was discussed that the drying process may be optimized by selectively supplying energy along the droplet trajectory. FIG. 10A shows an energy source 606 comprising a plurality of energy sources 6, 6' and 6" to provide the desired energy profile 7. Each energy source 6 delivers the desired amount of energy 7. FIG. 10B shows an energy source 607 with one energy source 6 that delivers the desired energy profile 7. The one energy source 6 may e.g. comprise a glow spiral designed in such a way that it delivers the desired energy profile 7.

Other energy sources combining elements of the energy sources as described above may be used without departing from the broader spirit and scope of the invention as set forth in the appended claims.

An alternative way to provide focused energy to the droplets may be to project the droplets into streams of drying air. FIG. 11 shows an example of such a stream of drying air.

In particular, FIG. 11A shows a side view of a segmented gas flow system 110, each provided with a droplet inlet 111 and a droplet outlet 112, and an air flow regulating structure 120, 121 arranged to accelerate the droplets towards each droplet outlet 112; and have the air flow diverted from the droplet trajectory 116.

The segmented gas guide structure of FIG. 11A is formed by a connected series of guides 115, 115', each having a droplet inlet structure 111 and a droplet outlet structure 112, that, in the shown example, is formed as structures 111, 112 at least partially separate from the central flow guide structure 113 providing generic flow P. The outlet structure 112 of the previous segment 115 is aligned with the inlet structure of a subsequent 115' thus forming a segment interface 111', so that the particle travels in a substantial straight trajectory 116 from inlet to outlet structures via the segment interface 111'. The vertical extension of the planar flow region is indicated by reference numeral 117. It is noted that the particle trajectory T is not aligned with the general flow P.

FIG. 11B shows an enlarged axial front view of the gas guide 115 having oppositely arranged upstanding walls 120, 121 converging in the direction of gravity, to provide, in use, a substantially planar flow 116 in a direction away from the generic flow direction P and having a flow velocity component oriented against the direction of gravity g being smaller than the flow velocity component of the generic flow; and being gradiented to provide droplet flotation. As can be seen, an effective planar region 116 is formed in the gas guide of a flow having a substantial planar form and a small vertical extension 117. In front view, inlet zone 111, central flow guide structure 113 and outlet zone 112 can be discerned.

Figure 12:
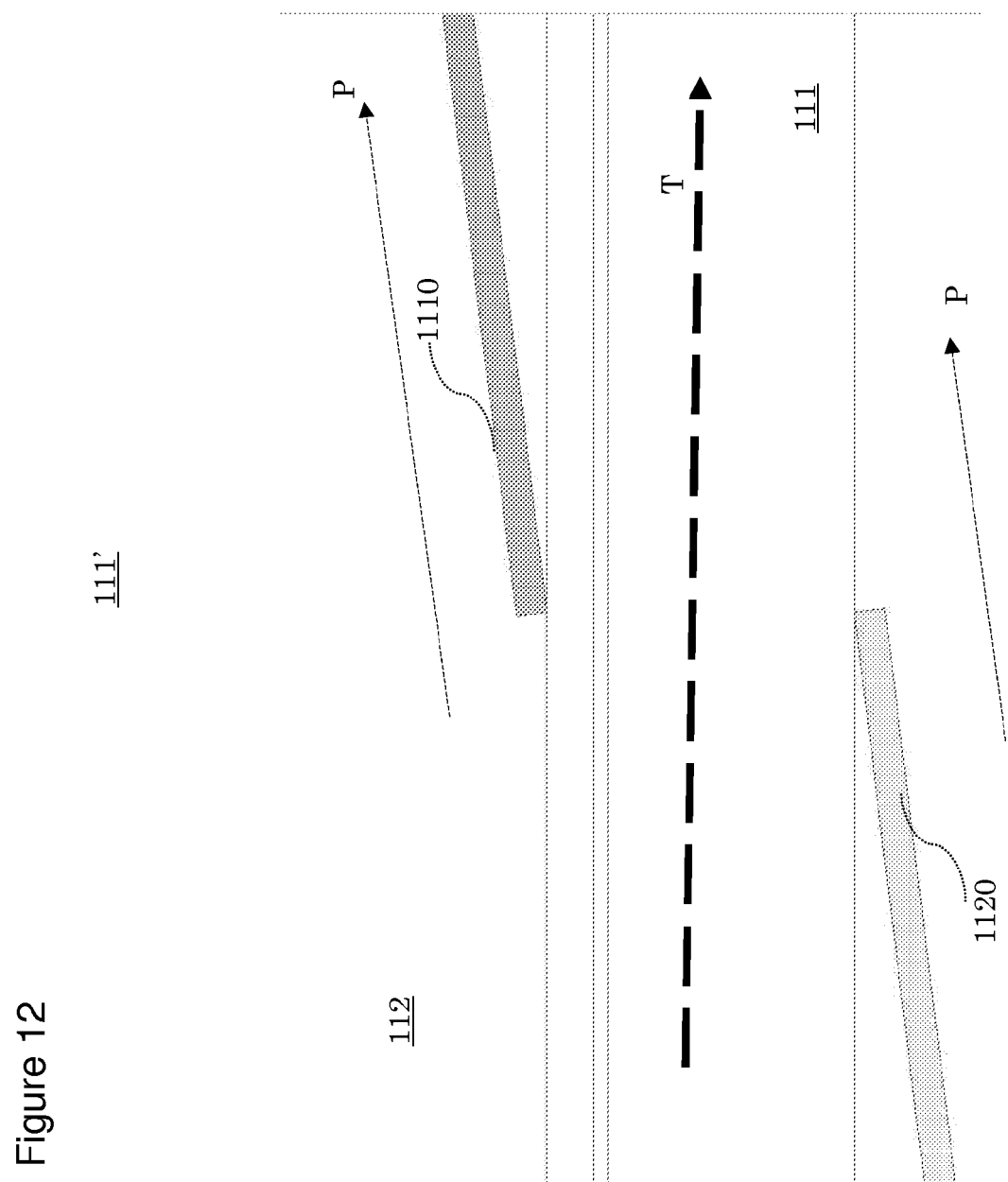

FIG. 12 shows a detail of the segment interface 111', where it can be seen that the inlet zone 111 has an inlet segment separation wall part 1110 aligned with an outlet segment separation wall part 1120 of the outlet zone 112 of a preceding segment. This arrangement prevents cross flow of an outlet flow P exiting outlet 112 entering the inlet 111 of a subsequent segment 115 and promotes proper droplet flow T.

Figure 13:
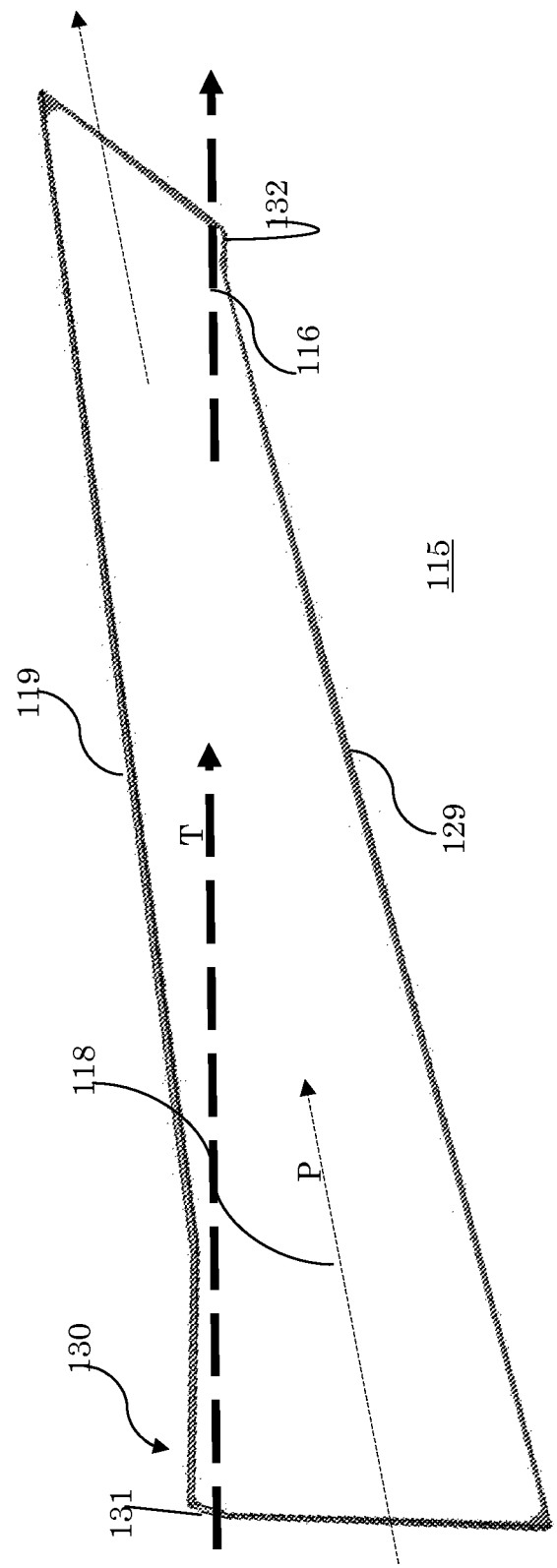
Figure 14:
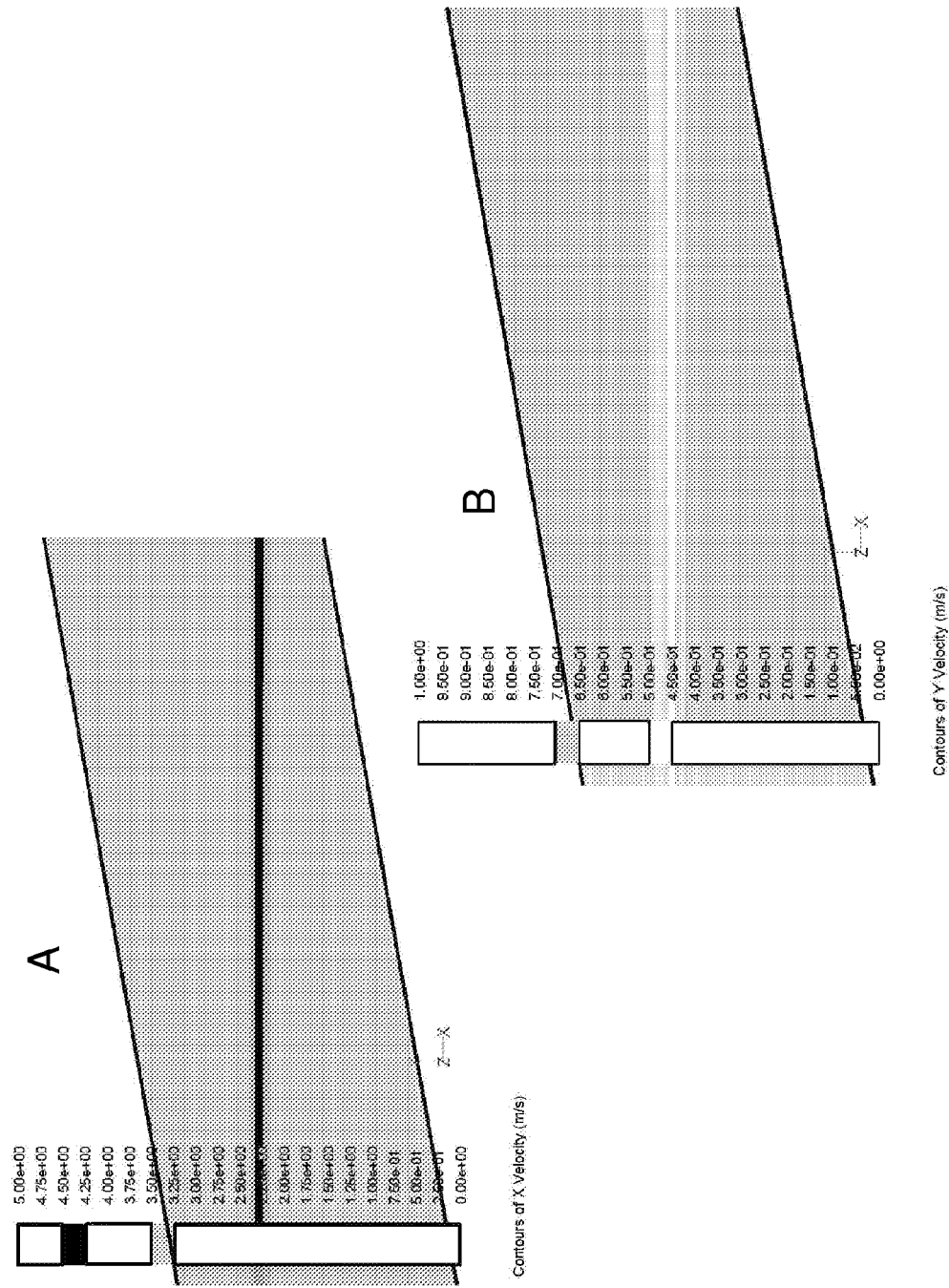

FIGS. 13 and 14 show a further exemplification of such a gas guide structure 115 in partial perspective view partially facing front shield 131. In effect, a planar flow T is provided wherein the particle is transported along a trajectory 116 in a direction away from the generic flow profile 118 formed by the gas flow structure. FIG. 13 shows a calculated design for a box formed gas flow 115 guide having converging sidewalls (see FIG. 11) in the direction of gravity. In addition, oppositely arranged bottom and top walls 119, 129 may define a wedge shaped volume in between said walls converging in the direction of generic flow P.

The flow provides the effect of an effective balancing height where droplets of various sizes and weights can be balanced to a substantially constant flotation height. A wedge shaped boxed design 115 with converging flow 118 may accelerate the gas flow in the gas guide, and enhance the forming of the planar flow profile 116 in a direction away from the generic flow profile 118. Gas inlet zone 130 may have a shielding part 131 provided with a particle inlet opening. The inlet shield 131 prevents cross flow between two connected segments by providing an inlet flow zone 130 separate from the generic flow 118. This inlet flow zone 130 forms the beginning of the planar flow 116, extending towards an outlet zone shaped with a corresponding outlet zone 132 protruding from the bottom wall 129.

FIG. 14 shows the calculated flow profiles for the wedge shaped structure of FIG. 13. FIG. 14A shows an X-velocity profile, detailing a substantially constant high forward velocity component in the planar flow, defining an X-direction along the trajectory 116 of a particle. The X-velocity component along the droplet trajectory is substantially higher than the X-velocity of the generic flow; an illustrative difference is 4.5 m/s of the planar flow against 3.5 m/s of the generic flow. The FIG. 14B diagram shows a corresponding decreased vertical component of the planar flow defining a Y-velocity profile. Here it is shown that the local vertical flow velocity in the planar profile is substantially lower than the generic flow component; an illustrative difference, depending on geometry, is 0.45 m/s of the planar flow against 0.65 m/s of the generic flow.

It is noted that although in the above the invention is mainly positioned in the field of spray drying liquids for providing powders, the invention may also be applied in other fields, e.g. the field of droplet printing electrical components like insulators and semiconductors. In this particular field, metal salts are dissolved, preferably in water but also in organic solvents and printed subsequently.

Providing energy along the droplet trajectory causes pyrolysis and melting of an organometallic compound and allows a metal layer to be printed on the surface of a substrate. To print ceramic elements, ceramic suspensions are printed, dried and sintered.

The detailed drawings, specific examples and particular formulations given serve the purpose of illustration only. The embodiments described show vertical, line shaped trajectories. It is however also possible to use other, e.g. horizontal or curved trajectory forms. Furthermore, other substitutions, modifications, changes, and omissions may be made in the design, operating conditions, and arrangement of the exemplary embodiments without departing from the scope of the invention as expressed in the appended claims.

Unless physically impossible, any feature developed in the embodiments is deemed to be disclosed in combination with any other feature of other embodiments, specifically as elaborated in the subsequent claims.

In the claims, any reference signs placed between parentheses shall not be construed as limiting the claim. The word 'comprising' does not exclude the presence of other features or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

The invention claimed is:

1. A system for spray drying a fluid, the system comprising:
a fluid reservoir;
a spraying device, the spraying device comprising at least one outflow opening, for projecting droplets of fluid from the reservoir out of the at least one outflow opening; and
at least one energy source for at least partially drying the droplets,
wherein the at least one energy source is an electromagnetic radiation source; and
wherein the spraying device is arranged to project the droplets into a determinable droplet trajectory, and wherein the at least one energy source is positioned with respect to a reflective energy focusing element so as to focus the energy from the at least one energy source in at least one focal point, arranged for providing energy focused substantially on the droplet trajectory.

2. The system according to claim 1, wherein the spraying device comprises a vibrating nozzle arranged to provide monodisperse droplets by Rayleigh break-up.

3. The system according to claim 1, wherein the energy source is further arranged for selectively providing energy along the droplet trajectory.

4. The system according to claim 1, wherein the system further comprises a gas flow guide arranged for manipulating a droplet guiding gas stream to aerodynamically focus droplets into the determinable droplet trajectory.

5. The system according to claim 4, wherein the gas flow guide is tubular.

6. The system according to claim 4, wherein the gas flow guide comprises an inlet piece and an outlet piece defining a generic flow direction and a droplet trajectory along oppositely arranged upstanding walls, the walls defining an elongated space of limited width and having an axial direction aligned with the droplet trajectory; in use arranged to provide a gradiented laminar gas flow in the gas guide and having a gas flow velocity equal or larger than the droplet velocity, thereby defining the droplet trajectory.

7. The system according to claim 6, wherein the gas flow guide has a box form and wherein the oppositely arranged upstanding walls are converging in the direction of gravity, to provide, in use, a substantially planar flow in a direction away from the generic flow direction and having a flow velocity component oriented against the direction of gravity being smaller than the flow velocity component of the generic flow; and being gradiented to provide droplet flotation.

8. The system according to claim 4, wherein the gas flow guide further comprising oppositely arranged bottom and top walls defining a wedge shaped volume in between said walls converging in the direction of flow.

9. The system according to claim 4, wherein the energy source is provided as a heater arranged to heat the walls of the gas guide.

10. The system according to claim 4, wherein the energy source is provided as an air conditioner providing a conditioned air flow in the gas guide.

11. The system according to claim 4, further comprising a plurality of connected segments, each provided with a droplet inlet and a droplet outlet, and an air flow regulating structure arranged to accelerate the droplets towards each droplet outlet; and have the air flow diverted from the droplet trajectory.

12. The system according to claim 11, wherein between a droplet outlet and a droplet inlet a droplet deceleration structure is provided to decelerate the droplet prior to receiving the particle in a particle inlet of a subsequent segment.

13. A method for spray drying a fluid, the method comprising the steps of:
projecting droplets of fluid from a reservoir out of at least one outflow opening; and
at least partially drying the droplets with energy provided by at least one energy source,
wherein the at least one energy source is an electromagnetic radiation source; and wherein
the droplets are projected into a determinable droplet trajectory and the energy is focused substantially on the droplet trajectory.

14. The method according to claim 13, wherein the method further comprises the step of manipulating a droplet guiding gas stream to aerodynamically focus droplets into the determinable droplet trajectory.

* * * * *